United States Patent [19]

Wietzel et al.

[11] 4,089,367

[45] May 16, 1978

[54] FOOD PROCESSING APPARATUS

[76] Inventors: Antoine Wietzel; René Roche, both of 8 Impasse du Plan, La Trinite, France

[21] Appl. No.: 562,960

[22] Filed: Mar. 28, 1975

[30] Foreign Application Priority Data

May 3, 1974 France .................................. 74 16711
Feb. 25, 1975 France .................................. 75 06789

[51] Int. Cl.² .................. F25B 29/00; A23C 3/02; F16F 1/34; F28F 27/00
[52] U.S. Cl. .................................. 165/61; 165/96; 165/71; 165/101; 99/483; 99/348
[58] Field of Search .............. 99/348, 470, 483, 485; 165/61, 27, 100, 101, 71, 96; 259/99, 102

[56] References Cited

U.S. PATENT DOCUMENTS

| | | | |
|---|---|---|---|
| 969,018 | 8/1910 | Willmann | 165/61 |
| 1,762,081 | 6/1930 | Schleicher | 259/102 |
| 2,006,299 | 6/1935 | Kaestner | 165/61 |
| 2,557,622 | 6/1951 | Trier | 99/348 X |
| 2,576,050 | 11/1951 | Soden | 99/470 X |
| 2,919,639 | 1/1960 | Cronin | 99/483 |
| 3,195,622 | 7/1965 | Houfler et al. | 165/101 |
| 3,209,673 | 10/1965 | Howard | 99/470 X |
| 3,910,812 | 10/1975 | Kaneko | 165/61 |

*Primary Examiner*—Harvey C. Hornsby
*Assistant Examiner*—Robert Pous
*Attorney, Agent, or Firm*—Michael Ebert

[57] ABSTRACT

An integrated unit for manufacturing food products, the food being processed in a vat having a double-wall defining a jacket which surrounds the vat chamber. Associated with the vat are two tanks, one containing a heated liquid and the other a cooled liquid. A selective valve arrangement is provided to recirculate the heated liquid from the hot tank through a closed circuit or to circulate it through the jacket to heat the vat contents, or to recirculate the cooled liquid from the cold tank through a closed circuit or to circulate it through the jacket to cool the vat contents.

6 Claims, 9 Drawing Figures

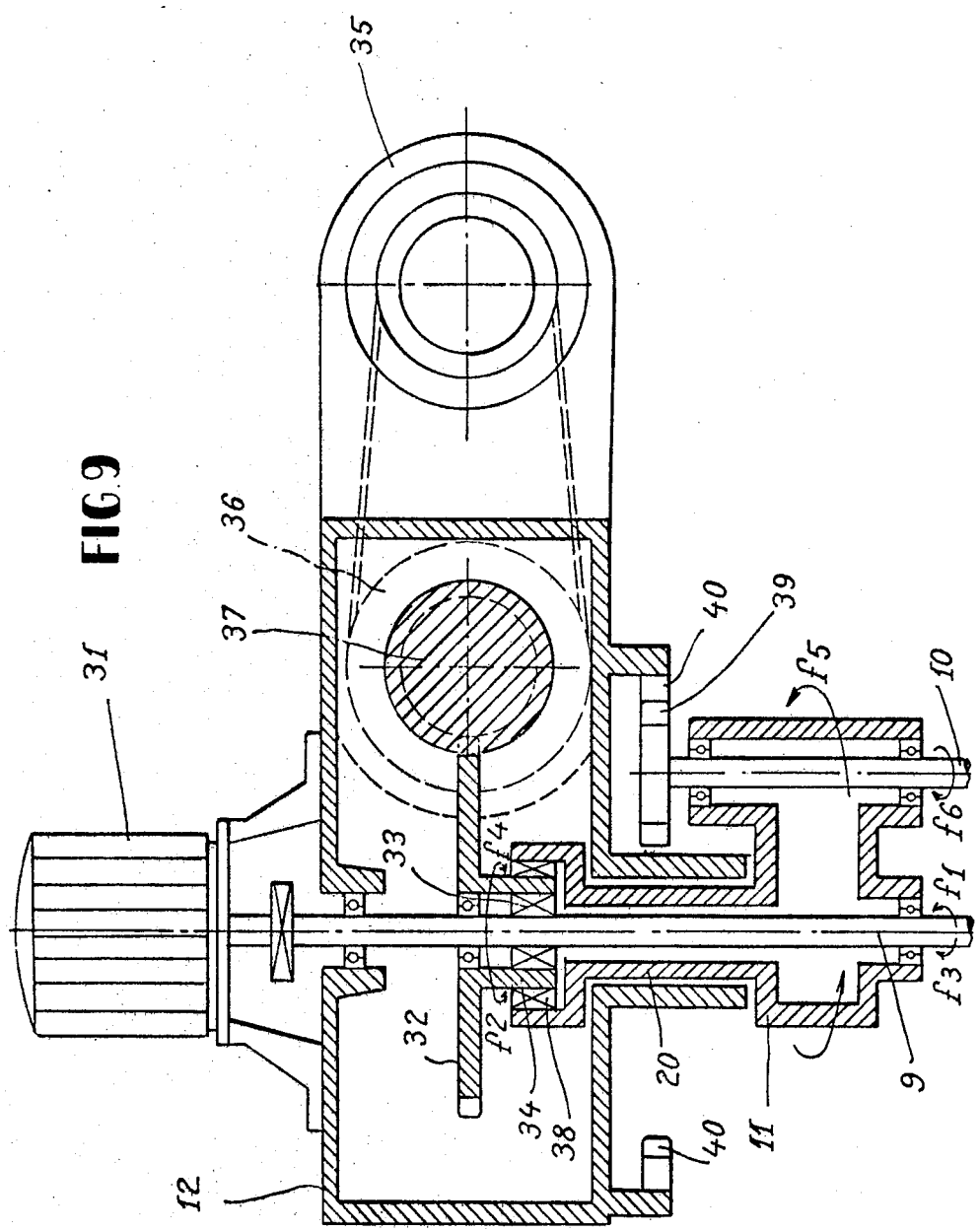

FOOD PROCESSING APPARATUS

BACKGROUND OF INVENTION

This invention relates generally to apparatus for manufacturing food products, and more particularly to an integrated food processing unit wherein various functions such as heating and cooling are combined to form a highly compact and efficient food manufacturing machine.

In the manufacture of food products such as candies, pastries, meat and other preparations, various types of apparatus are used to carry out the required processing steps. Thus heaters are required for cooking; mixers, grinders and choppers are necessary to chop or grind and intermingle the ingredients; and refrigeration and pasturization equipment is needed to cool and preserve the food product.

The material being processed is usually contained in a double-walled vat, the vat being provided with mixers or beaters. The jacket defined by the double wall of the vat surrounds the vat chamber and serves to circulate a liquid whose temperature is such as to raise the temperature of the food material in the vat to a desired level.

The difficulty experienced with existing food processing arrangements in which separate machines at different locations are used to carry out the respective processing functions is that the overall system is expensive, cumbersome and inefficient.

Moreover, a great deal of time is lost in the operation of the system, for it is necessary to transfer from one processing machine to another, as a result of which the manufacturing procedure is complicated and costly.

SUMMARY OF INVENTION

In view of the foregoing, it is the main object of this invention to provide a food processing machine which overcomes the drawbacks of prior art arrangements by combining in a single unit which includes a double-walled vat, the various components necessary to carry out heating, cooling and other functions.

A significant feature of a unit in accordance with the invention resides in the fact that manufacturing procedures are greatly simplified and made more efficient, for it is no longer necessary to transfer from one machine to a differently located machine in the course of manufacturing operations. Moreover, the space requirements for the unit are relatively small, so that economies are effected in both installation and operating costs.

Briefly stated, in a unit in accordance with the invention, two tanks are provided, one for a heated liquid and the other for a cooled liquid. The hot and cold tanks are selectively coupled through respective valves to the jacket of the vat, the arrangement being such that heated liquid from the hot tank is recirculated through this tank in a closed circuit, or is circulated through the jacket to heat the contents of the vat, or cooled liquid from the cold tank is recirculated through this tank in a closed circuit or is circulated through the jacket to cool the contents of the vat.

OUTLINE OF DRAWING

For a better understanding of the invention as well as other objects and further features thereof, reference is made to the following detailed description to be read in conjunction with the accompanying drawing, wherein:

FIG. 1 schematically shows an arrangement in accordance with the invention in which a hot tank is coupled to the jacket of a food processing vat;

FIG. 2 schematically shows an arrangement according to the invention in which a cold tank is coupled to the vat jacket;

FIG. 3 is a side view of a preferred embodiment of a food processing unit in accordance with the invention;

FIG. 4 separately shows the pump included in the unit and the valve associated therewith;

FIG. 9 is a sectional view of a third embodiment of a unit in accordance with the invention.

DESCRIPTION OF INVENTION

Figure 1:
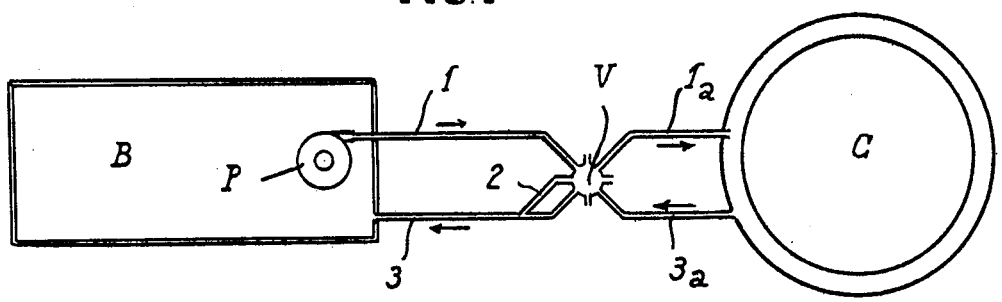

Referring now to FIG. 1, there is shown a vat C having a double-wall defining a jacket which surrounds the vat chamber, the chamber containing the food ingredient to be processed. Associated with vat C is a tank B containing a liquid, the tank being provided with suitable heating means, such as a controllable electric resistance element (not shown), for raising the temperature of the liquid in the tank to a desired level. In practice, the temperature range may extend to 140° C. Tank B is therefore referred to as the hot tank.

Also provided is a pump P which functions to pump the tank liquid into an outlet pipe 1 which is coupled to a multiple-position valve V or an equivalent set of spigots. Also coupled to valve V is a pipe 1a leading to the inlet of the jacket of vat C, a by-pass pipe 2 leading to a return pipe 3 coupled to the inlet of tank B, and a pipe 3a connected to the outlet of the jacket.

The valve arrangement is such that in one operative position thereof, pipe 1 is coupled only to by-pass pipe 2 which feeds the pumped hot liquid back into return pipe 3 to create a closed circuit, whereby the hot liquid is recirculated through tank B, no liquid going into the jacket.

In a second operative position of valve V, pipe 1 is connected to pipe 1a, while pipe 3a is connected to return pipe 3, the by-pass pipe 2 then being blocked, whereby hot liquid from tank B flows in a circuit which includes the vat jacket, so that now the hot liquid circulating through the jacket transfers heat to the contents of the vat to cook or heat ingredients contained therein.

In a third operative valve position, the connection between pipes 1 and 1a is blocked to prevent liquid from being fed into the jacket, and the connection between pipes 3 and 3a is open, by-pass pipe 2 also being open, so that now the liquid contained in the jacket is drained therefrom and returned to tank B through pipes 3a and 3. The valve also has a closed position which blocks all pipes associated therewith.

Figure 2:
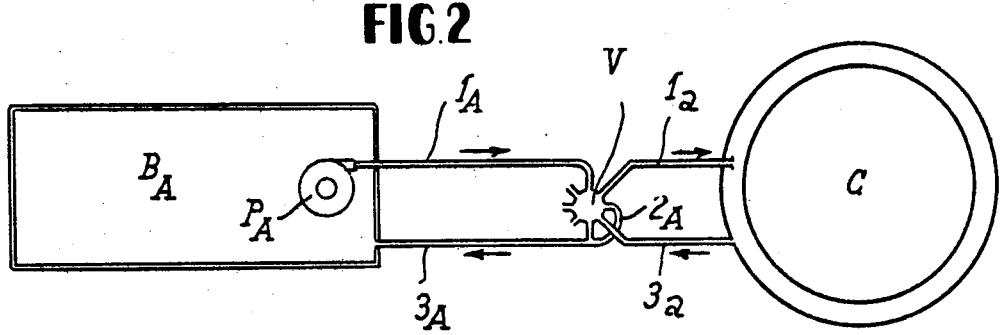

FIG. 2 shows the arrangement for a tank $B_A$ which is provided with a pump $P_A$ and suitable refrigeration means for reducing the temperature of the liquid therein to a low temperature, such as in a range extending to say, 30 degrees centigrade. Thus tank $B_A$ is the cold tank and it is associated with the jacket of vat C through a suitable set of channels in valve V by means of pipes $1_A$ and $3_A$, which are selectively connected with the vat pipes 1a and 3a in a manner corresponding to the operation of pipes 1 and 3 in FIG. 1. Closed circuit operation is effected by by-pass pipe 2A.

It is, of course, necessary that the valve arrangement for the two tanks be such as to prevent intermingling of the hot and cold liquids. Hence while draining the vat jacket of hot liquid, so that this liquid is returned to tank B, the flow of cold liquid from tank $B_A$ must be blocked at this time. Similarly, before filling the vat jacket with cold liquid from tank $B_A$, the return passage through pipes 3 and 3a for tank B must be closed. Conversely, the valve operations for the cold tank $B_A$ must be such as to prevent interference with the hot tank B, and before filling the jacket with hot liquid from tank B, the return passage through pipes 3a and $3_A$ for tank $B_A$ must be blocked.

In practice, vat C is mounted above tanks B and $B_A$ (see FIG. 5) so that when there is to be a switch from cold to hot, the liquid contained in the vat jacket is first emptied therefrom by gravity flow through pipe 3a, which pipe is vertical or inclined. Moreover, the valve sets for the two tanks can be joined together to constitute a single operating means V. Thus as shown in FIGS. 3 and 4, the upper section of valve V operates in conjunction with one tank and the lower section in conjunction with the other tank.

Figure 3:
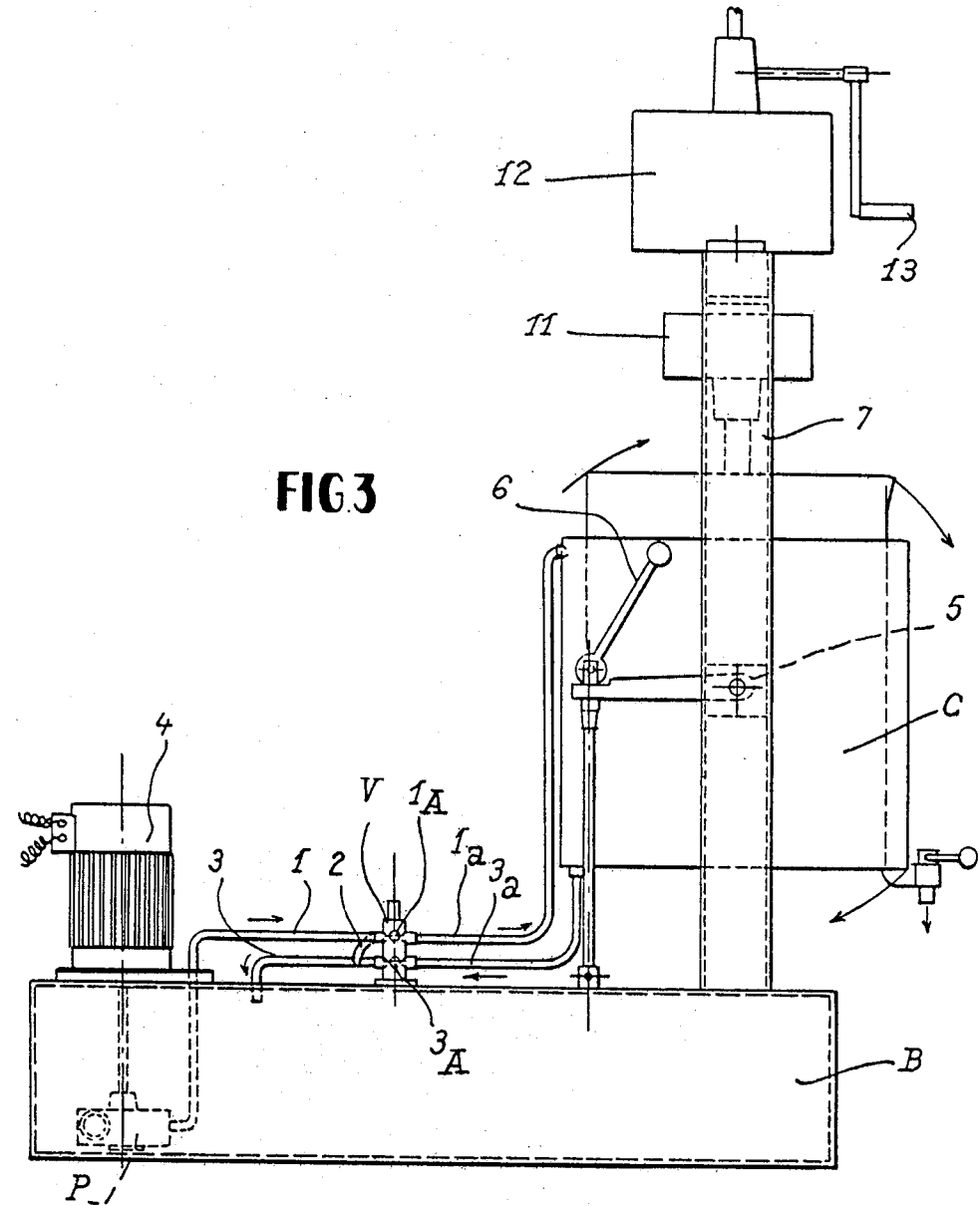
Figure 4:
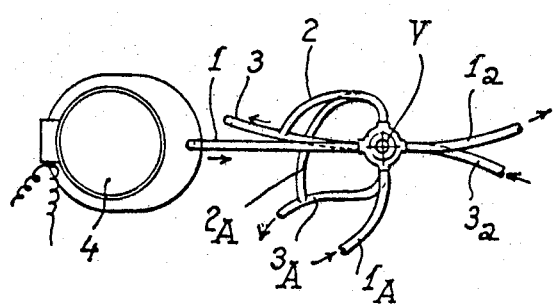
Figure 5:
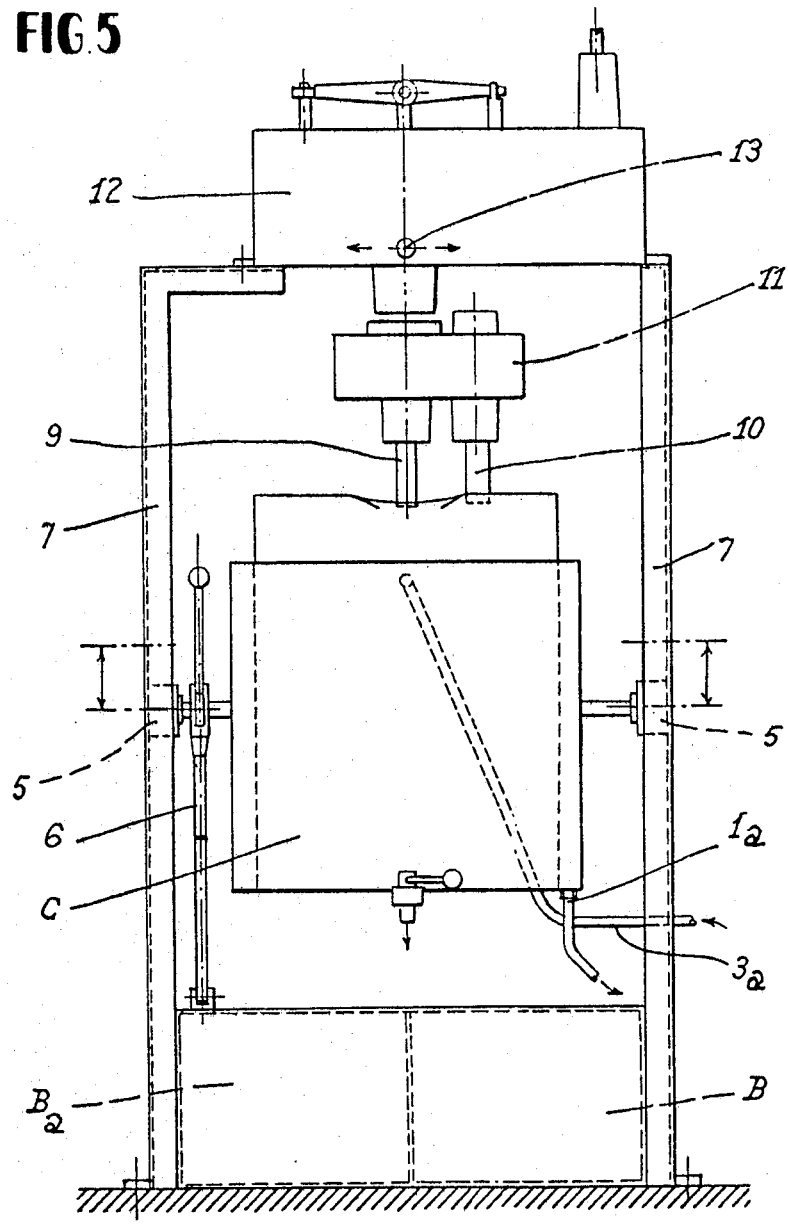
FIG. 5 is a front view of the unit.

In FIGS. 3 and 4, the pump motor shown schematically in FIGS. 1 and 2 is represented by pump 4. Vat C is pivotally mounted on a frame to pivot about a horizontal axis 5, to facilitate access to the food contents of the vat if it is solid or viscous. If the contents are in liquid form, by tilting the vat one may discharge the liquid therefrom. The vat is tilted by means of a lever 6. Since the vat is tiltable, pipes 1a and 3a coupled to the vat jacket are constituted by flexible tubes. The frame includes a pair of spaced vertical beams 7, the vat being pivotally supported therebetween.

Mounted above the frame is the housing 12 for mixer controls, the mixer functioning to stir, mix, and homogenize the material contained in the vat C below the housing.

The mixer comprises two mixing elements, including a spindle 9 having blades which turn about an axis at speeds ranging, for example, from 500 to 2000 RPM, and a spindle 10 revolving in a planetary motion around spindle 9, to which it is coupled by a gear train contained in housing 11, to operate at a speed of from 50 to 300 RPM.

Figure 6:
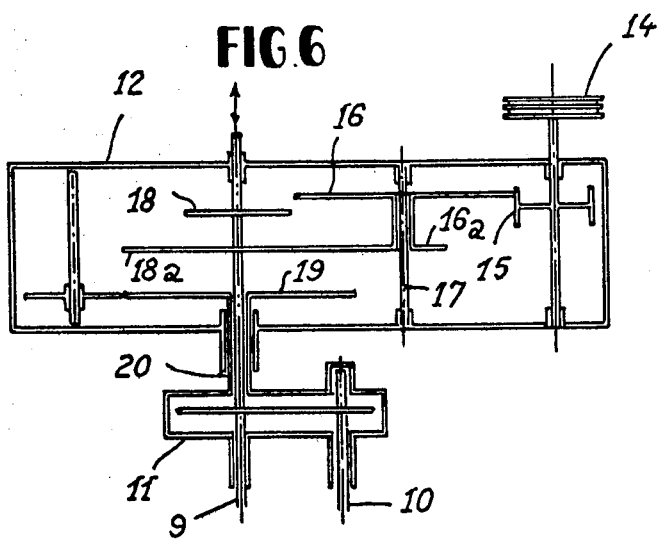
FIG. 6 shows the mixer assembly included in the unit.

The actuating mechanism for the spindles that is enclosed in the housing 12 on the top of the machine is shown in greater detail in FIG. 6. It will be seen in this figure that a drive-shaft 14, which is coupled to a suitable motor, supports a broad-toothed wheel 15 intermeshing with the top wheel 16 of a double wheel 16-1-6a rotatably mounted on and shiftable along a vertical axis 17, the double-wheel having three operative positions on this axis.

In the first position, which is that illustrated in FIG. 6, wheel 16 is disengaged, while wheel 16a meshes with a wheel 18a keyed to mixer spindle 9, thereby imparting to this spindle a low rotary speed. The second position is effected sliding the double-wheel downardly on axis 17, wheel 16 being then brought into mesh with a wheel 18 to cause the spindle 9 to operate at high speed. Speeds between the low and high extremes are obtained by varying the speed of the drive motor.

In a third position, wheel 16a is brought down to a still lower level into engagement with a wheel 19. Wheel 19 is integral with the casing 20 of housing 11 which imparts to spindle 10 a planetary motion that is combined with the rotary motion of spindle 10 about its own axis. The actuating mechanisms for the spindles shown in FIG. 6 are controlled by means of a crank 13, as shown in FIG. 3.

It will be appreciated, therefore, that the machine disclosed in FIGS. 1 to 6 is capable of performing all of the necessary processing operations. The food may be heated and cooled by switching from the hot to the cold tank or vice versa, the switching action being easily and simply accomplished by selective operation of the valve V. Similarly, changes in the mixing modes are effected by simply sliding the double wheel 16–16a by means of a selector fork and lever.

In the first embodiment shown in FIGS. 1 to 6, the vat includes a single double-wall jacket serving both to heat and cool the contents of the vat. In the second embodiment shown in FIGS. 7 and 8, the jacket is composed of two compartments which are insulated from each other. The cooling compartment F surrounds the vat from the top to the bottom thereof and is coupled by its own ducts to a direct expansion cooling system activated by a compressor.

A heating compartment U is located at the bottom of vat C and is provided with a heating resistance R to heat the liquid to the desired temperature. The heating compartment is open to the atmosphere through a vent and communicates with a reserve compartment 29, also open to the atmosphere, the position of which is adjustable in height relative to the heating compartment to allow filling or emptying of the heating compartment.

Figure 7:
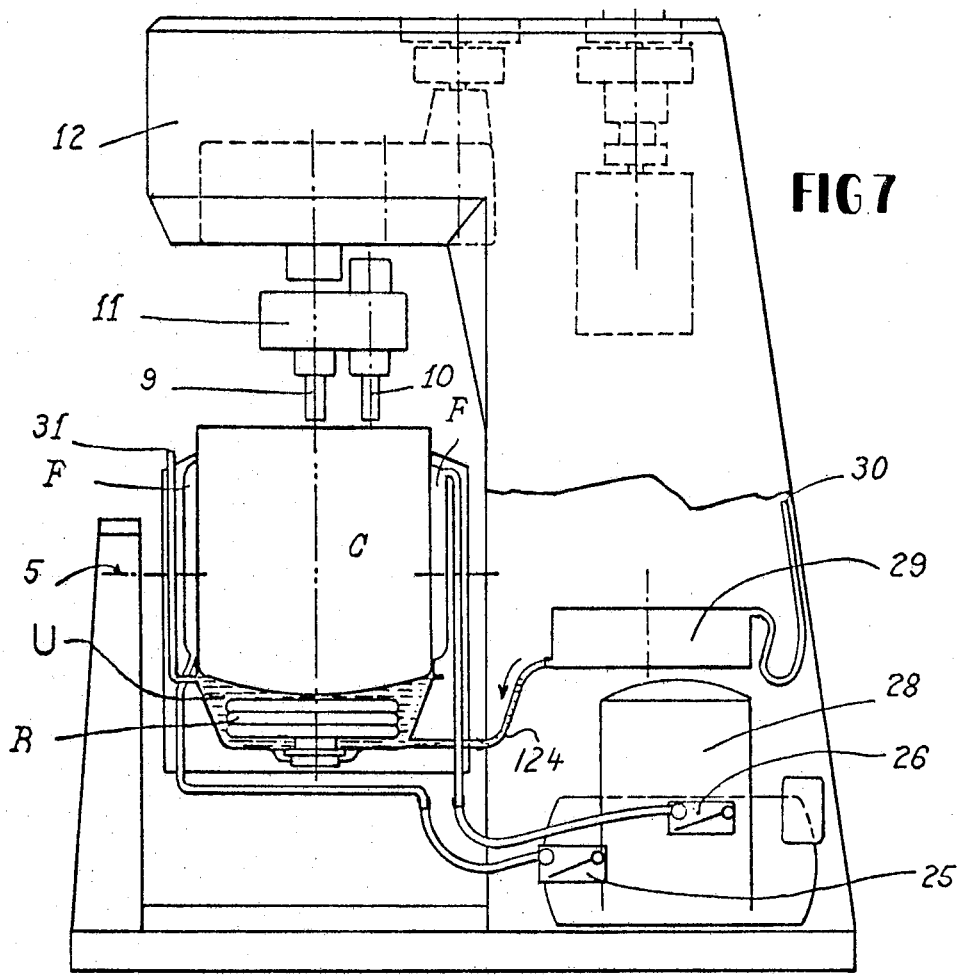
FIG. 7 is a side view of a second embodiment of a unit in accordance with the invention in one operating condition.

In FIG. 7, heating compartment U is full of liquid which in practice may be oil. Reserve compartment 29 is at a raised position, so that liquid therefrom descends by gravity through conduit 124 into the heating compartment U. The reserve compartment 29 communicates with the atmosphere by way of a pipe 30, and compartment U is vented by way of pipe 31.

It is to be noted that in the mode shown in FIG. 7, that is, when the vat is being heated, cooling compartment F is empty and consequently acts as an insulator around vat C. By elevating the reserve compartment 29, for example, by rack means or lever tilting means, the liquid in the compartment is caused by gravity to flow into the heating compartment.

Figure 8:
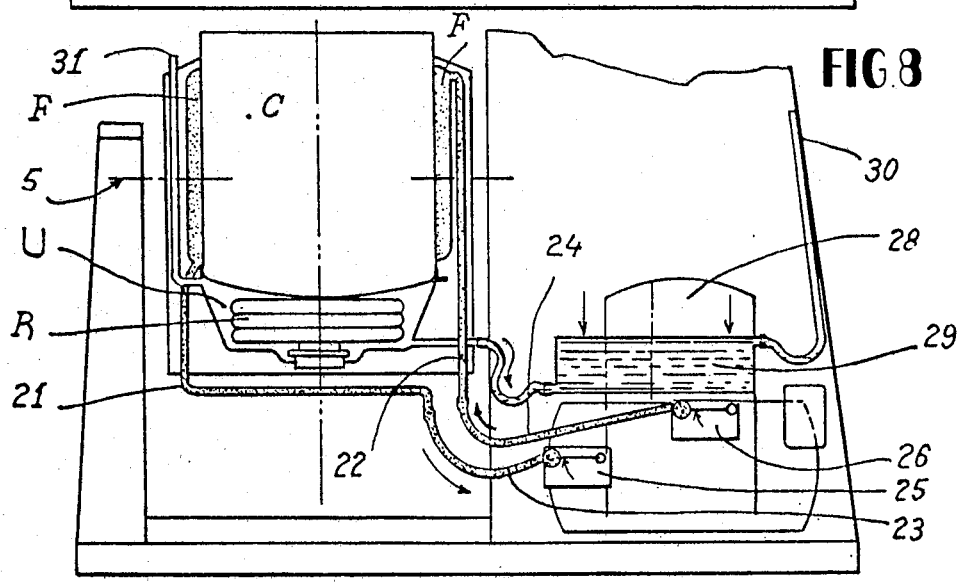
FIG. 8 is the same unit as in FIG. 7, but in another operating condition.

FIG. 7 is a front view of the second embodiment, vat C being in the process of being heated. FIG. 8 is a partial view, vat C being in the process of being cooled. Cooling compartment F is coupled by pipes 21 and 22 to two flexible tubes 23 and 24 which lead, respectively, to two electro-valves 25 and 26 of a compressor assembly 28 actuating a direct expansion refrigeration system.

In FIG. 8, heating compartment U is empty of all hot liquid, valves 25 and 26 being open, whereas cooling compartment F is filled with a refrigerant fluid and functions to cool vat C. In FIG. 7, heating compartment U is full of liquid, which liquid may be oil. Reserve compartment 29 is at a raised position so that liquid therefrom descends by gravity into heating compartment U. Reserve compartment 29 communicates with the atmosphere by way of a pipe 30, and the compartment U communicates with the atmosphere by way of a pipe 31.

It will be seen in FIG. 8 that electrovalve 25 is associated with a pipe 23 coupled to the bottom of jacket F; hence when this valve is opened, the cooling agent in the jacket is caused by gravity flow to flow back, as indicated by the arrow on page 23, into refrigerator 28 which is at a lower level than jacket F. Electrovalve 26, on the other hand, is associated with a pipe 22 whose arrow indicates that when this valve is opened, the cooling agent from refrigerator 28 is pumped into the top of cooling jacket F. Thus these valves associated with the refrigerator control the direction of flow with respect to the cooling jacket coupled thereto.

When, therefore, food in the vat is to be cooled, valve 26 must be operated to feed the cooling agent into the cooling jacket. But when the food is to be heated to a pasteurization temperature, then the cooling agent must be drained from the jacket which then acts as thermal insulation, and for this purpose valve 25 must be operated.

In the third embodiment of the invention shown in FIG. 9, the drive means acts to drive the main shaft or spindle either at high speed in one direction or reduced speed in the other, and to drive the satellite shaft or spindle around the main shaft independently of the latter. This embodiment makes it possible to attain these operations in a simple manner, with sturdy equipment operated without risk by inexperienced personnel.

In this respect, the machine which comprises a main shaft mounted on a fixed housing and driven directly in one direction at high speed by a first motor, and a satellite shaft parallel to the main shaft capable of turning about itself and mounted eccentrically in an auxiliary housing capable of turning around the main shaft relative to the fixed housing, comprises, on the one hand, a toothed-plate capable of being driven rotationally in one direction or the other by a second motor and which cooperates through a first free wheel with the main shaft and through a second free wheel with the rotatable auxiliary housing, and, on the other hand, a wheel with internal teeth forming a part of the stationary housing and cooperating with a pinion integrated with the satellite shaft to drive the latter rotationally around its axis when the auxiliary housing turns relative to the main housing.

In FIG. 9, which is a vertical cross-section of the third embodiment of the invention, we see the main shaft and satellite shafts or spindles 9 and 10, and the rotary auxiliary housing 11 and the stationary main housing 12. In a first mode of operation, the main shaft 9 is driven directly by a first motor 31 at high speed in one direction. This one direction we shall denote as positive and express it by the arrow $f_1$. In this first mode, the toothed-plate 32 is not driven, since the free wheel 33 located between the casing 34 of said plate and the shaft 9 uncouples the two elements.

In a second mode of operation, a second motor 35 drives the plate 32 by means of a reducing gear 36 and a toothed wheel 37. The plate is driven in a negative direction, denoted by the arrow $f_2$, so that the shaft 9 will then be driven in the same negative direction (arrow $f_3$) by means of the free wheel 33 which has now become active. But the drive will take place at reduced speed by virtue of the reduction due to the various transmission means between the motor 35 and shaft 9. At the same time the auxiliary housing 11 and hence the satellite shaft 10 are not driven, the free wheel 38 uncoupling these elements from the casing 34.

In a third mode of operation, the motor 35 is energized so as to turn in a direction opposite from the preceding one. The plate 32 which, therefore, turns in a positive direction (arrow $f_4$), drives the housing II in the same direction (arrow $f_5$), by means of the free wheel 38 now active, while the main shaft 9 is not driven by the plate since the free wheel 33 uncouples these two elements.

In the rotating motion of housing 11, the pinion 39 of the satellite shaft 10 meshes with the stationary, internally toothed disk 40 of housing 12 and shaft 10 turns, therefore, in a direction opposite to that of housing 11, that is, in a negative direction (arrow $f_6$).

We shall now give two examples of how the machine is usable to process food.

1. Ice cream

Starting with a mixture for making ices, cream or butter must be added to form ice cream, but this will inevitably result in the formation of fat particles, producing a non-homogeneous ice cream. By attaching a bladed mixing element on the spindle 9 and operating at 2000 RPM, in a few seconds the mixture is rendered homogeneous and ready for freezing.

Once the mixture is ready, it is not removed from the vat but is transformed into ice cream at 180° in a few minutes of additional cooling. Temperature is controlled by a thermometer set on the machine. To go from the stage of pasteurization to that of freezing, all one has to do is substitute for the pasteurizing agitator a centrifuge.

2. Almond-paste

After the sugar is cooked in the vat, a mixer plate is attached on the planetary spindle 10, almonds are added and the hot liquid is evacuated and cold liquid introduced. The almond paste cools and solidifies rapidly. Five seconds are then enough before replacing the mixing blade with a cutting crusher on the rotating spindle 9, and in a few minutes the almond paste is ready.

While there have been shown and described preferred embodiments of a food processing apparatus in accordance with the invention, it will be appreciated that many changes and modifications may be made therein without, however, departing from the essential spirit thereof.

We claim:

1. Apparatus for processing food products comprising:
   A. a vat for containing a food product to be processed, said vat having a double-wall side portion defining a cooling jacket and a double wall bottom portion defining a heating compartment;
   B. a closed cycle refrigeration device external to said vat and operatively coupled to said jacket and provided with means selectively to supply a liquid cooling agent thereto to cool the food product and means to drain said cooling agent from said jacket;
   C. a heating element disposed in said compartment;
   D. a reserve tank coupled to said heating compartment and means to move said reserve tank in the vertical direction relative to said compartment whereby the compartment may be filled with or drained of liquid, conduit means between said reserve tank and said heating compartment, said heating compartment containing a liquid heating agent which is heatable by said element and drainable into said tank through said conduit means, said jacket when drained of said cooling agent acting as a thermal insulator for said vat when said compartment contains said liquid heating agent to heat the food product.

2. Apparatus as set forth in claim 1, further including a rotary means operatively coupled to the vat to effect mixing of the food therein.

3. Apparatus as set forth in claim 2, wherein said rotary means includes two spindles, one of which is rotatable on a major axis, the second being rotatable on a satellite axis which undergoes planetary motion about said major axis.

4. Apparatus as set forth in claim 1, wherein said heating compartment and said reserve compartment are vented to the atmosphere.

5. Apparatus as set forth in claim 1, wherein said element is an electrical resistance element adapted to heat said product to a pasteurization temperature.

6. Apparatus as set forth in claim 1, wherein said cooling jacket is coupled to said refrigeration device by input and output ducts, each having an electro-valve therein to control the flow of said liquid cooling agent.

* * * * *